United States Patent [19]

Savas et al.

[11] Patent Number: 4,800,020

[45] Date of Patent: Jan. 24, 1989

[54] PISTON FILTERING DEVICE

[75] Inventors: Peter G. Savas, Concord, Mass.; Virginia S. Kiger, Old Bridge, N.J.; Ronald R. Boudreau, Fitchburg, Mass.

[73] Assignee: Xydex Corporation, Bedford, Mass.

[21] Appl. No.: 52,780

[22] Filed: May 21, 1987

[51] Int. Cl.⁴ .............................................. B01D 33/00
[52] U.S. Cl. ..................................... 210/359; 422/101
[58] Field of Search ................. 422/99, 101; 210/656, 210/657, 359, 198.2, 927

[56] References Cited

U.S. PATENT DOCUMENTS

| | | | |
|---|---|---|---|
| 3,512,940 | 5/1970 | Shapiro | 23/259 |
| 3,802,843 | 4/1974 | Kim | 422/101 |
| 4,035,294 | 7/1977 | Landers et al. | 210/359 |
| 4,057,499 | 11/1977 | Buono | 210/359 |
| 4,131,549 | 12/1978 | Ferrara | 210/359 |
| 4,189,385 | 2/1980 | Greenspan | 210/359 |
| 4,454,231 | 6/1984 | Cais et al. | 436/500 |
| 4,456,690 | 6/1984 | Cais et al. | 436/500 |
| 4,510,058 | 4/1985 | Cais et al. | 210/657 |
| 4,587,221 | 5/1986 | Cais et al. | 436/500 |
| 4,588,556 | 5/1986 | Sarstedt | 210/359 |
| 4,643,981 | 2/1987 | Card | 210/359 |

Primary Examiner—Richard V. Fisher
Assistant Examiner—Wanda L. Millard
Attorney, Agent, or Firm—Hamilton, Brook, Smith & Reynolds

[57] ABSTRACT

A filtering device of the piston-cylinder type having a piston (P) and a cylinder (C) with reduced cross-sections (36) and (16) to create a pressurization chamber to force all fluids within the closed end of the cylinder into the piston as the piston is urged toward the closed end of the cylinder.

26 Claims, 2 Drawing Sheets

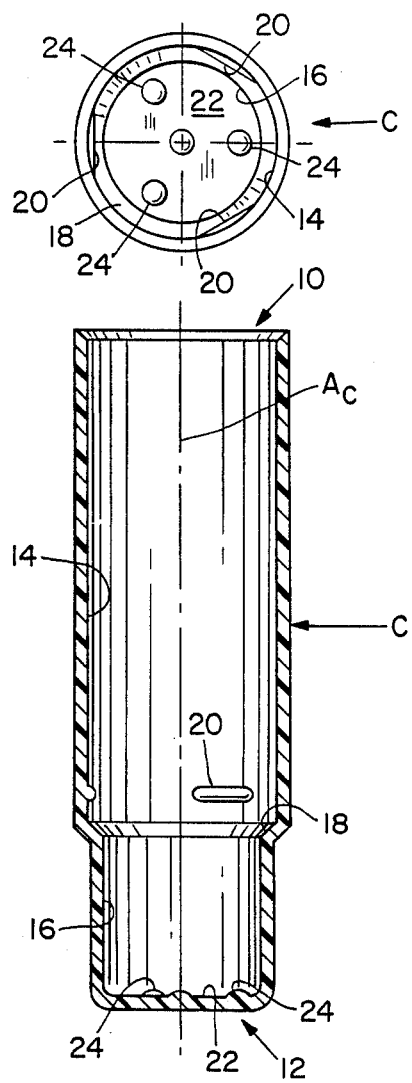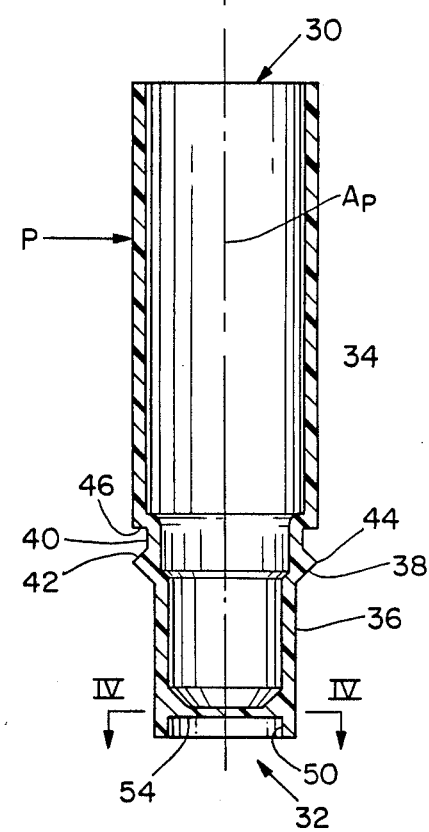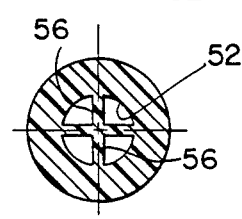

PISTON FILTERING DEVICE

FIELD OF THE INVENTION

This invention relates to filters and more specifically to a laboratory type, small, manually operated filter for separating particles from liquids.

BACKGROUND OF THE INVENTION

Many manually operated laboratory filters exist today which permit the removal of particles or solids from fluids producing a filtrate which may then be analyzed or put to other predetermined uses. For the most part, the degree of filtration is a function of the filter employed. It is possible, with a filter which can be held in one hand, to generate up to 100 lbs. per square inch to force unfiltered liquid through extremely fine filter material separating out unwanted solids.

Typically a laboratory type, manually operated filter is one in which a hollow piston slides within a cylinder, the cylinder being open at one end and closed at the other. The piston likewise, is open at one end and partially closed at the other, the partially closed end mounting appropriate filter material. Sealing means in the form of a gasket are employed between the exterior piston wall and the interior cylinder wall to create pressure within the cylinder to force liquid through the filter.

Unfiltered liquid is first poured into the cylinder and the piston is then forced into the cylinder with the seal causing the space between the cylinder and piston walls to be pressurized. This initially forces air out of the cylinder and through the filter into the hollow, open piston. When the filter, which is located at the partially closed end of the piston, engages the unfiltered fluid, the then compressed air in the chamber forces the fluid up into the hollow piston from which the filtrate may then be withdrawn and processed.

Filtering devices of this type are shown in U.S. Pat. Nos. 4,454,231, 4,456,690, 4,510,058 and 4,587,221. They have proven to be successful in carrying out the transfer of one or more components from one liquid phase to another liquid phase, the two phases being substantially immiscible.

An earlier United States Patent to Shapiro, U.S. Pat. No. 3,512,940, discloses a pressure or vacuum filter which is used with a common laboratory test tube in the manner described above. The filter consists of a hollow plunger which acts as a piston. The plunger has a porous bottom portion which is a filter. When the piston is inserted into a test tube which contains an unfiltered fluid and forced downly thereof, the filtrate is forced upwardly into the hollow plunger from which it is subsequently removed for testing.

Conversely, the procedure may be reversed. First the plunger is forced all the way into the test tube and unfiltered liquid is placed in the hollow plunger. The plunger is withdrawn from the test tube, thereby creating a vacuum which will draw the fluid through the filter. The plunger may then be removed and the filtrate removed from the test tube. This device has proven to be a relative simple and quick means for extracting filtrate from an unfiltered fluid.

One limitation of the Shapiro device is the fact that test tubes, being round at the bottom and the plunger being flat at the bottom, always left unfiltered fluid in the test tube. In one version of the Shapiro device a substantial amount of fluid remains in the test tube because the downward movement of the plunger into the test tube is intentionally stopped at a predetermined point to prevent deformation of the filter which was in the form of a cup-like member projecting from the bottom of the plunger.

In modern medicine, more and more tests are performed on biological samples taken directly from humans. One process is to pick up a biological sample by means of a cotton swab or the like, extract the sample from the swab and test it for whatever organisms may be present. The cotton swab is immersed in an extracting fluid called an extraction buffer. The sample could include, for example, a mixture of saliva, blood, mucus, cells, bacteria, viruses, and the like. Since the sample is generally small in volume, only small amounts of extraction buffer can be employed, so as not to dilute the sample excessively.

The sample is then filtered to remove the solids, such as blood clots, mucus and cells. The filtrate, comprising the extraction buffer, viruses, bacteria and the like, is then removed for analysis. Hence, it is important to have all of the filtrate pass through the filter so that none will be wasted and remain in the filtering device.

Because of the construction of the Shapiro device, it is not capable of extracting substantially all of the filtrate. This is particularly so because of the use of round or arcuate bottomed test tubes, and because of the desire not to crush the cup-like filter which projects from the bottom of the plunger.

As a result, an object of the present invention is to provide a filtering device of the cylinder/piston type, which is capable of recovering substantially all of the filtrate from an unfiltered fluid containing a sample.

SUMMARY OF THE INVENTION

The invention resides in a filtering device which includes a hollow chamber, e.g., a cylinder, which is open at one end and closed at the other. A length of the cylinder adjacent the closed end has a cylindrical cross-section which has a reduced internal diameter, i.e., less than that of the remainder of the cylinder. A hollow piston, which is open at one end and which is partially open at the other, slides within the cylinder. The open ends of the piston and cylinder face in the same direction. A length of the piston adjacent the partially open end has a reduced cross section, i.e., it is less than the cross section of the remainder of the piston.

The reduced external cross-section of the piston is smaller than the reduced internal cross-section of the cylinder to create a gap between them when the piston is inserted into the cylinder. The filter material is located in the partially open end of the piston.

The piston is slidable in the cylinder with its partially open or filter end movable toward the closed end of the cylinder and reduces the volume of space between the piston and the cylinder at the closed end of the cylinder. Sealing means between the piston and the cylinder causes the space to be pressurized to force fluid in the cylinder through the filter into the hollow piston.

Stop means limit the movement of the piston toward the closed end of the cylinder to leave a space between the partially open or filter end of the piston and the closed end of the cylinder which approximates the size of the gap measured diametrically of the piston and the cylinder. The stop means comprises at least one projection on the closed end of the cylinder which is engagable with a portion of the partially open or filter end of the piston. The piston itself has a cruciform lattice structure against which the filter and its support are retained by a retaining ring.

There are releasable restraining means between the piston and the cylinder to retain the piston at the closed end of the cylinder.

The gap between the reduced external surface of the piston and the reduced internal surface of the cylinder is from about 0.01 inch to about 0.08 inch and depends on the viscosity of the fluid to be filtered.

The reduced cross-section of the piston intersects the remainder of the piston at a frusto conical surface to assure that there are no sharp corners in which fluid may collect. The cylinder is similarly constructed at the intersection of the reduced diameter and the remainder of the cylinder.

The filter is retained in the partially open end of the piston against a reinforced support which prevents its being dislodged during the filtering process.

The above and other features of the invention including various novel details of construction and combinations of parts will now be more particularly described with reference to the accompanying drawings and pointed out in the claims. It will be understood that the particular filtering device embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 1 is a sectional view of the hollow cylindrical portion of the filtering device.

FIG. 2 is a plan view of the cylindrical portion of the filtering device when viewed from the open end.

FIG. 3 is a sectional view of the hollow piston portion of the filtering device.

FIG. 4 is a sectional view taken on lines IV IV of FIG. 3.

DETAILED DESCRIPTION OF THE INVENTION

Figure 5:
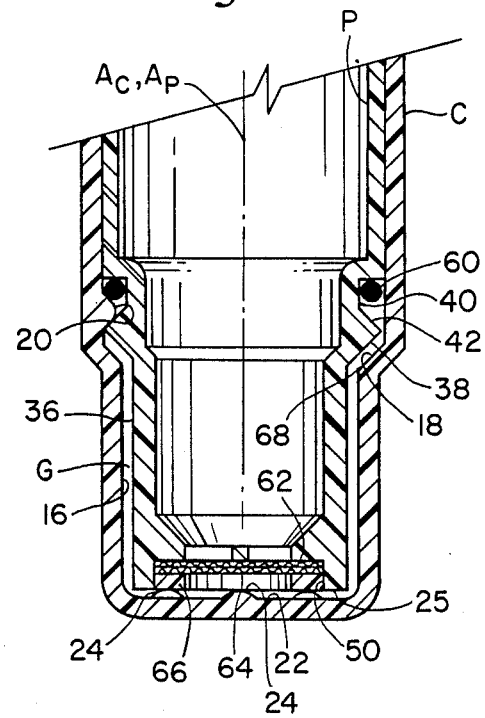
FIG. 5 is a sectional view on a slightly enlarged scale of the piston and cylinder when assembled.

A filtering device embodying the present invention includes a hollow chamber, e.g., a cylinder C and a hollow piston P having central axes $A_c$ and $A_p$ respectively. The piston and cylinder may be made of plastic or other appropriate material. Referring to FIGS. 1 and 2, the cylinder is open at one end 10 and closed at the other end 12. It has a constant internal diameter or cross section 14 for a majority of its length and adjacent the closed end there is an internal diameter or cross-section 16 of reduced diameter. The area of the reduced cross-section 16 intersects the remainder of the cylinder 14 at a frusto conical annular surface 18.

Spaced equidistantly around the interior diameter of the cylinder C are projections 20, the function of which will be explained in greater detail hereinafter.

Extending upwardly from the interior surface 22 of the closed end of the cylinder are circular projections 24, the function of which will also be described in greater detail hereinafter.

Referring next to FIGS. 3 and 4, the piston of the filtering device will now be described. It has an open end 30 and a partially open end 32. The piston P has a hollow cylindrical constant diameter or cross section portion 34 for more than half of its length and a portion of reduced external diameter or cros-section 36, which is adjacent the partially open end 32. The reduced diameter portion 36 terminates in a frusto conical portion 38, which is formed on the same angle as the frusto conical portion 18 of the cylinder C. A groove 40 is formed adjacent the frusto conical portion 38 and includes a second frusto conical portion 42 intersecting the first portion 38 to form, in effect, a projecting angular ridge 44. The portion 42, together with an annular ring 46, defines the groove 40.

The partially opened end of the cylinder includes a circular recessed opening 50 within which there is a circular opening 52 in a wall portion 54. The opening is partially closed by a grid 56 illustrated as cruciform legs.

Figure 6:
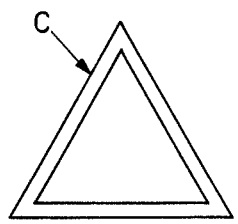
FIGS. 6, 7 and 8 are alternative cross-sectional configurations of the piston and cylinder.
Figure 7:
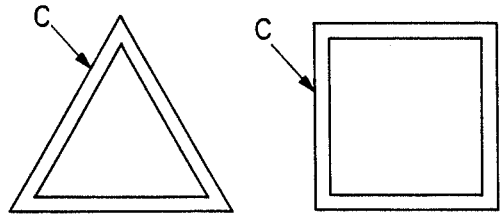
Figure 8:
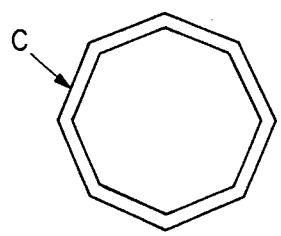

While the piston P and the cylinder C have been described as being cylindrical, it will be understood that they can assume other cross-sectional shapes as well. For example, they could be triangular as shown schematically in FIG. 6, rectangular or square as shown schematically in FIG. 7, or polygonal as shown schematically in FIG. 8, a hexigon being illustrated. The cylindrical form is preferred because of ease of manufacture, but as long as the piston and cylinder each have the same cross-sectional configuration, (the piston being smaller, of course), with their walls being parallel or symmetrical to their axes $A_c$ $A_p$ respectively, they are within the scope of the present invention.

Referring next to FIG. 5, the piston and cylinder are shown in assembled form.

Prior to inserting the piston into the cylinder, an O-ring 60 is placed in the annular groove 40 and a wafer-like, non-woven, plastic support 62 in the form of a circular disc, is placed in the circular recess 50 in the partially open end of the piston. This support member 60 abuts the cruciform legs 56. Next a disc of filter material 64 of the desired pore size is placed against the support 62. The filter 64 and the support 60 are held in place by a plastic retaining ring 66, which fits in the opening 50 and which may be heat sealed in permanent position.

Filter material usable with this invention is readily available commercially. The selection of the filter is dependent upon the material being filtered and the degree of filtration desired.

The frusto conical portions 18 and 42 assure that any liquid in the cylinder will be free to flow toward the closed end thereof and not be trapped or retained by an angle of 90°s or less.

It will be noted that there is a cylindrical gap defined by the reduced internal diameter 16 of the cylinder and the reduced external diameter 36 of the piston. This gap is constant lengthwise of the axes $A_c$ and $A_p$ of the assembled piston and cylinder and is from about 0.01 to 0.08 inches. The exact dimension is selected in accordance with the viscosity of the material to be filtered, the greater the viscosity the greater the gap. Note also, that the gap extends between closed bottom 22 of the cylinder and the lower most surface 25 of the filter end of the piston, the bottom of the retaining ring 66 being a continuation of this surface. This is accomplished by the spaced projections 24 projecting from the bottom 24 of the cylinder. The spacing being essentially the same dimension as the gap. The members 24 act as stop means for limiting how close the piston can approach the closed end of the cylinder.

It should also be noted that the annular ring 44 has passed beneath the projections 20 (one being shown in FIG. 5). Because of the flexibility of the material from which the piston and cylinder are made, the ring 44 snaps past the projections 20 and, having done so, retains the piston at the closed end of the cylinder. Being flexible, these cooperative retaining means are releasable.

The filtering device operates in the following manner. A biological sample to be analyzed is taken by a cotton swab or the like. An extraction buffer is poured into the cylinder and the cotton swab is immersed to extract the sample. The swab is then removed. The piston is inserted and is urged downwardly or toward the closed end 12 of the cylinder. Air, which is trapped because of the seal 60 between the piston and the cylinder, becomes compressed and flows upwardly through the filter 64 and its support 64. Air will continue to pass through the filter 64 until such time as the filter touches the top of the liquid. Then wicking will take place wetting the entire filter. Thereafter, as the piston continues its movement toward the closed end of the cylinder, the compressed air between the piston and the cylinder will force fluid upwardly through the filter 64. It is filtered in the process with particles being engaged and trapped by the lower surface of the filter 64. When the partially closed end 32 of the piston reaches approximately the lower annular boundary 68 of the frusto conical surface 18, the reduced portion 36 of the piston enters the reduced portion 16 of the cylinder creating the circular gap which becomes a virtual circular column of air continuously forcing fluid up into the piston.

As the piston continues to approach the closed end of the cylinder, its leading flat or filter end ultimately engages the stop means 24 with a gap between the piston and the flat bottom 22 of the cylinder. This space also becomes pressurized with air forcing all of the fluid upwardly through the filter and into the hollow piston.

By this time the releasable retaining means in the form of the annular ring 44 has been slightly flexed passing beneath the projections 20 thereby locking the piston in its position shown in FIG. 5 with the gap between the piston and the cylinder still pressurized and all of the fluid being in the interior of the piston.

The filtrate may then be removed from the piston for analysis with substantially no wastage.

Should it be desired, the piston and cylinder may be assembled as shown in FIG. 5 with the unfiltered solution being poured into the hollow piston with the piston then withdrawn from the cylinder to create a vacuum at the closed end of the cylinder and the filtration process will be reversed. The piston may be completely removed from the cylinder leaving only the filtrate in the cylinder.

We claim:

1. A filtering device comprising:
    a hollow cylinder, open at one end and closed at the other,
    an interior length of the cylinder contiguous with the closed end having a cylindrical cross section of reduced internal diameter,
    a hollow piston, open at one end and having an aperture at the other,
    a length of the piston contiguous with the end with the aperture having a cylindrical cross section of reduced external diameter,
    the reduced external diameter of the piston being smaller than the reduced internal diameter of the cylinder to create a cylindrical gap therebetween when the piston is inserted into the cylinder,
    filter material located across the aperture of the piston, and
    the piston being slidable in the cylinder with the end with the aperture movable toward the closed end of the cylinder and with the reduced diameter portion of the piston movable within the reduced diameter portion of the cylinder to reduce the volume of space between the piston and the cylinder at the closed end of the cylinder.

2. A filtering device according to claim 1 wherein there are releasable retaining means between the piston and the cylinder to retain the piston at the closed end of the cylinder.

3. A filtering device according to claim 1 wherein the gap is from about 0.01 inch to about 0.08 inch.

4. Filtering device according to claim 1 wherein the reduced cross section of the piston joins the remainder of the piston at a frusto conical surface.

5. Filtering device according to claim 1 wherein the reduced cross section of the cylinder joins the remainder of the cylinder at a frusto conical surface.

6. Filtering device according to claim 1 wherein the filter is supported in the piston to prevent its being dislodged during the filtering process.

7. Filtering device according to claim 1 wherein the apertured end of the piston includes a cruciform grid to assist in positioning the filter.

8. A filtering device comprising:
    a hollow cylinder, open at one end and closed at the other,
    an interior length of the cylinder contiguous with the closed end having a cylindrical cross section of reduced internal diameter,
    a hollow piston, open at one end and having an aperture at the other,
    a length of the piston contiguous with the end with the aperture having a cylindrical cross section of reduced external diameter,
    the reduced external diameter of the piston being smaller than the reduced internal diameter of the cylinder to create a cylindrical gap therebetween when the piston is inserted into the cylinder,
    filter material located across the aperture of the piston, and
    the piston being slidable in the cylinder with the end with the aperture movable toward the closed end of the cylinder and with the reduced diameter portion of the piston movable within the reduced diameter portion of the cylinder to reduce the volume of space between the piston and the cylinder at the closed end of the cylinder, and
    stop means to limit the movement of the piston toward the closed end of the cylinder with a space therebetween approximating the size of the gap.

9. A filtering device according to claim 8 wherein there are releasable retaining means between the piston and the cylinder to retain the piston at the closed end of the cylinder.

10. A filtering device according to claim 8 wherein the gap is from about 0.01 inch to about 0.08 inch.

11. Filtering device according to claim 8 wherein the reduced cross section of the piston joins the remainder of the piston at a frusto conical surface.

12. Filtering device according to claim 8 wherein the reduced cross section of the cylinder joins the remainder of the cylinder at a frusto conical surface.

13. Filtering device according to claim 8 wherein the filter is supported in the piston to prevent its being dislodged during the filtering process.

14. Filtering device according to claim 8 wherein the stop means comprise at least one projection in the closed end of the cylinder engagable with a portion of the partially open end of the piston.

15. A filtering device comprising:
a hollow cylinder, open at one end and closed at the other,
an interior length of the cylinder contiguous with the closed end having a cylindrical cross section of reduced internal diameter,
a hollow piston, open at one end and having an aperture at the other,
a length of the piston contiguous with the end with the aperture having a cylindrical cross section of reduced external diameter,
the reduced external diameter of the piston being smaller than the reduced internal diameter of the cylinder to create a cylindrical gap therebetween when the piston is inserted into the cylinder,
filter material located across the aperture of the piston, and
the piston being slidable in the cylinder with the end with the aperture movable toward the closed end of the cylinder and with the reduced diameter portion of the piston movable within the reduced diameter portion of the cylinder to reduce the volume of space between the piston and the cylinder at the closed end of the cylinder, and
sealing means between the piston and the cylinder to pressurize the volume to force fluid in the cylinder through the filter and into the hollow piston.

16. A filtering device according to claim 15 wherein there are releasable retaining means between the piston and the cylinder to retain the piston at the closed end of the cylinder.

17. A filtering device according to claim 15 wherein the gap is from about 0.01 inch to about 0.08 inch.

18. Filtering device according to claim 15 wherein the reduced cross section of the piston joins the remainder of the piston at a frusto conical surface.

19. Filtering device according to claim 15 wherein the reduced cross section of the cylinder joins the remainder of the cylinder at a frusto conical surface.

20. Filtering device according to claim 15 wherein the filter is supported in the piston to prevent its being dislodged during the filtering process.

21. A filtering device comprising:
a hollow chamber open at one end and closed at the other,
an interior length of the chamber contiguous with the closed end having a reduced cross sectional area relative to the cross sectional area of the length of the chamber adjacent the open end of the chamber,
a hollow piston, open at one end and having an aperture at the other end,
a length of the piston contiguous with the apertured end having a reduced cross sectional area relative to the cross sectional area of the length of the piston adjacent the open end of the piston,
the reduced cross section of the piston being smaller than the reduced cross section of the chamber to create a gap between the external walls of the piston and internal walls of the chamber when the piston is inserted into the chamber,
filter material located at the apertured end of the piston, and
the piston being slidable in the chamber with the apertured end movable toward the closed end of the chamber to reduce the volume between the piston and the chamber at the closed end of the chamber.

22. A filtering device according to claim 21, further comprising:
stop means for limiting movement of the piston toward the closed end of the chamber with a space therebetween approximating the size of the gap.

23. A filtering device according to claim 21, further comprising:
sealing means between the piston and the chamber to pressurize the volume in the gap to force fluid in the chamber through the filter and into the hollow piston.

24. A filtering device according to claim 21, further comprising:
releasable retaining means between the piston and the chamber for retaining the piston adjacent the closed end of the chamber.

25. A filtering device according to claim 21, further comprising:
a frusto conical surface region joining the piston length of relatively reduced cross sectional area and the piston length of relatively larger cross sectional area.

26. A filtering device according to claim 21, further comprising:
a frusto conical surface region joining the chamber length of reduced cross sectional area and the chamber length of relatively reduced cross sectional area.

* * * * *